United States Patent [19]

Brown et al.

[11] Patent Number: 5,343,826
[45] Date of Patent: Sep. 6, 1994

[54] FLUID INDICATOR ASSEMBLIES FOR SIGHT FLOW APPARATUS

[75] Inventors: David E. Brown, Brunswick; David E. Purcel, Lorain, both of Ohio

[73] Assignee: Clark-Reliance Corporation, Strongsville, Ohio

[21] Appl. No.: 922,814

[22] Filed: Jul. 31, 1992

Related U.S. Application Data

[63] Continuation-in-part of Ser. No. 747,263, Aug. 19, 1991, Pat. No. 5,249,464.

[51] Int. Cl.$^5$ ............. G01F 15/06; G01F 23/02
[52] U.S. Cl. ............. 116/275; 116/273; 116/276; 73/323; 416/80; 416/231 B
[58] Field of Search ............. 73/323, 330, 331, 334; 116/264, 276, 273, 274, 275; 137/559; 415/118; 416/80, 178, 187, 231 B

[56] References Cited

U.S. PATENT DOCUMENTS

| | | | |
|---|---|---|---|
| 1,124,575 | 1/1915 | Zimmer | 137/559 |
| 1,463,174 | 7/1923 | Paterson et al. | 116/274 |
| 2,525,914 | 10/1950 | Knauth | 73/861.77 |
| 3,156,408 | 11/1964 | Whitenack, Jr. | 416/187 X |
| 3,185,128 | 5/1965 | Moore et al. | 116/276 |
| 3,702,741 | 11/1972 | Goettl | 416/178 X |

FOREIGN PATENT DOCUMENTS

| | | | |
|---|---|---|---|
| 1202018 | 9/1965 | Fed. Rep. of Germany | 116/276 |
| 2732680 | 2/1979 | Fed. Rep. of Germany | 416/178 |
| 952774 | 11/1949 | France | 137/559 |
| 38-16683 | 9/1963 | Japan | 137/559 |
| 16709 | 2/1979 | Japan | 416/178 |
| 85593 | 7/1981 | Japan | 416/178 |
| 754055 | 8/1956 | United Kingdom | 416/231 B |
| 797238 | 6/1958 | United Kingdom | 116/276 |
| 884020 | 12/1961 | United Kingdom | 116/276 |

OTHER PUBLICATIONS

Penberthy Sight Flow Indicators Sales Literature; Issued May 1987 Author: Penberthy Pages: Title page. p. 2, 3, 4.
Tuchenhagen Factory of Engineers Sales Literature Author: Tuchenhagen North America, Inc.
Sight Flow Indicators—Jacoby-Tarbox; Author: Clark-Reliance Corporation pp. 6, 7, 8, 14, 17, 18 and 19.

*Primary Examiner*—William A. Cuchlinski, Jr.
*Assistant Examiner*—W. Morris Worth
*Attorney, Agent, or Firm*—Calfee Halter & Griswold

[57] ABSTRACT

A sight flow apparatus includes a body designed to be connected in-line to fluid pipes within a manufacturing plant or other facility. One or more window assemblies are removably mounted on the sides or ends of the body to allow visual inspection of fluid flow through the body cavity. A fluid indicator device i.e., a flapper assembly or a rotor assembly, is mounted within the body cavity and supported by an axle extending between the windows, between the body itself, or between a pair of alignment washers located within the body. The rotor assembly includes a plurality of planar blades which are interconnected to form generally radially extending vanes. An enlarged indicator cap is coupled to each end of the rotor assembly to improve visual examination of fluid flow effects, to lock the interconnected blades together and to prevent the blades from contacting the windows, alignment washer or body. The flapper assembly for the sight flow apparatus includes a single blade which is coupled on each end to the axle with an enlarged indicator cap. The indicator cap on the rotor assembly and the flapper assembly facilitate visually inspecting the fluid flow through the windows in the sight flow apparatus over a wide range of fluid conditions.

45 Claims, 6 Drawing Sheets

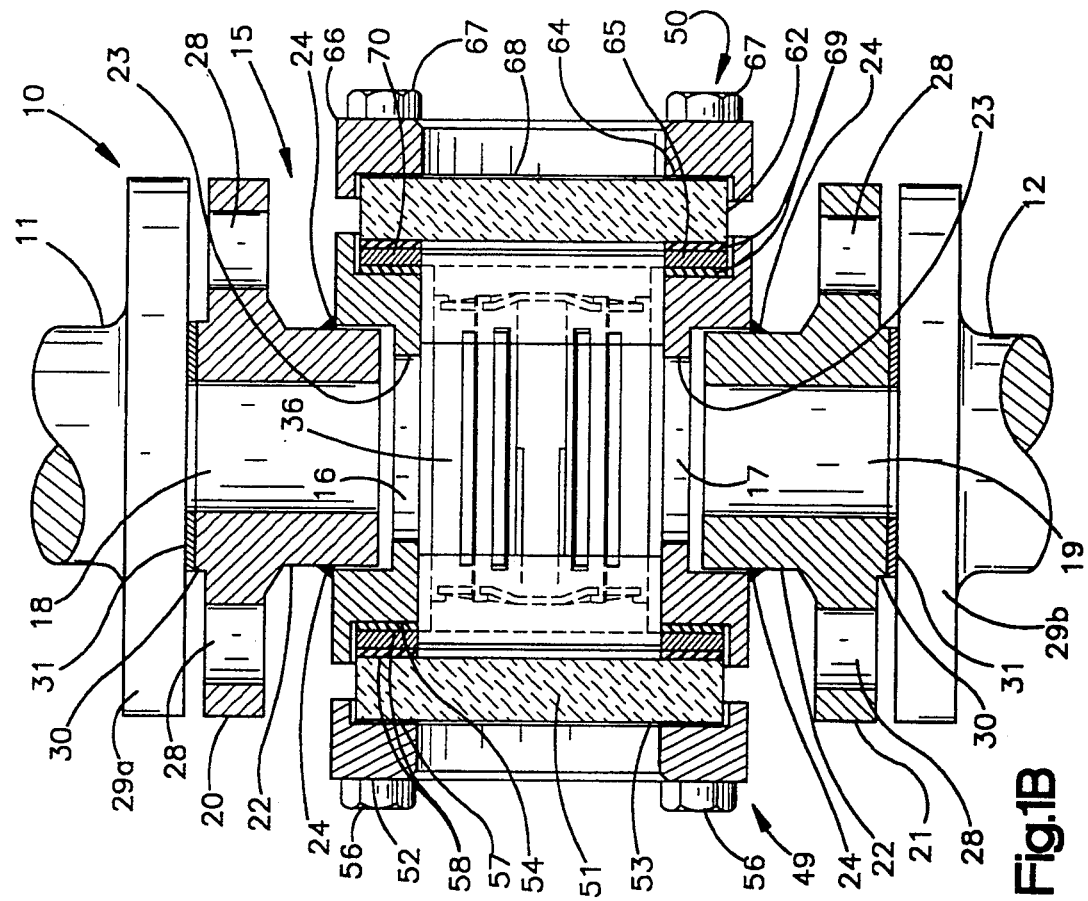
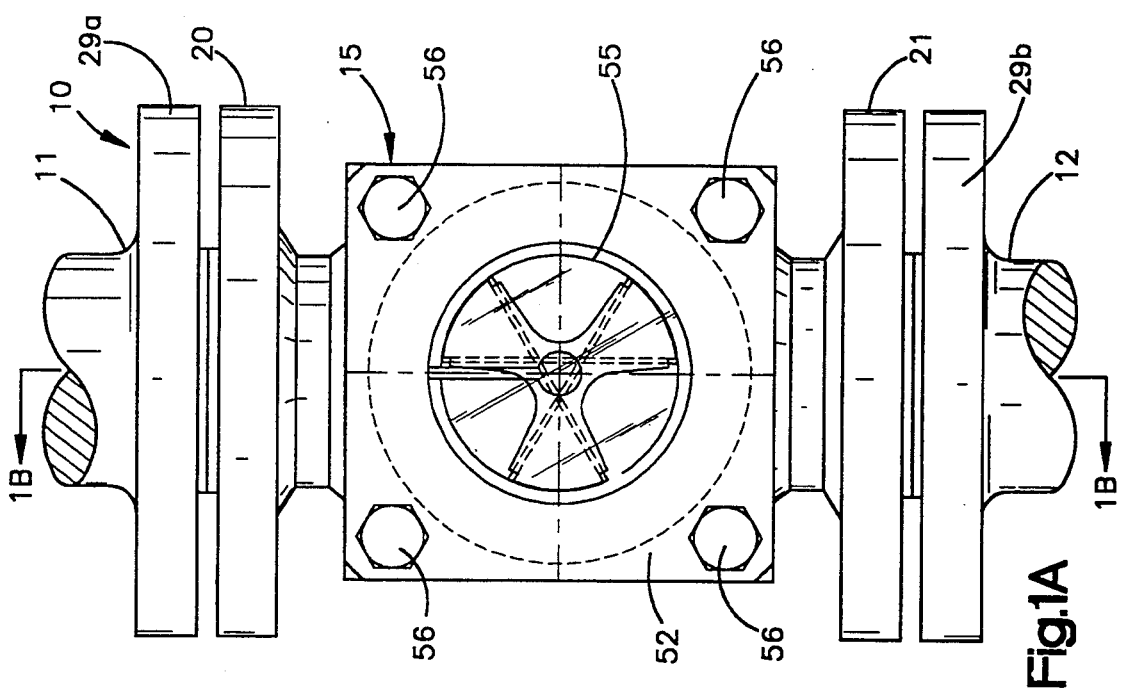

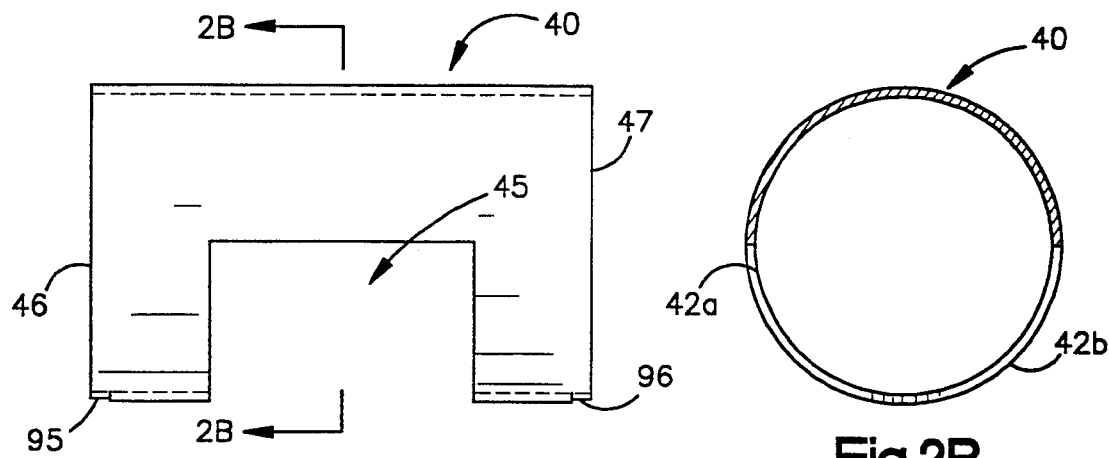
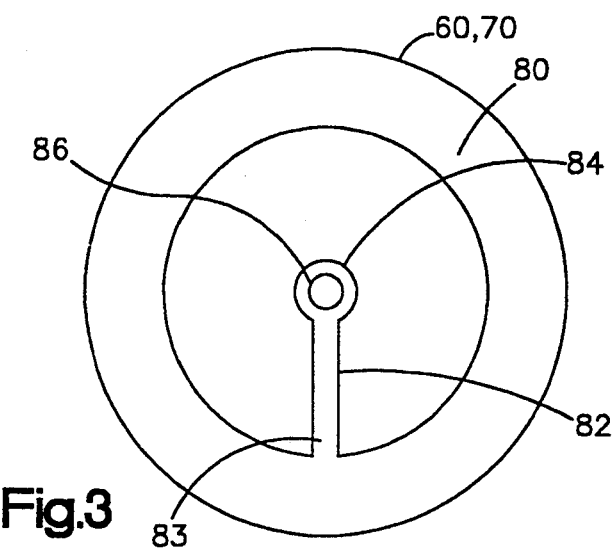
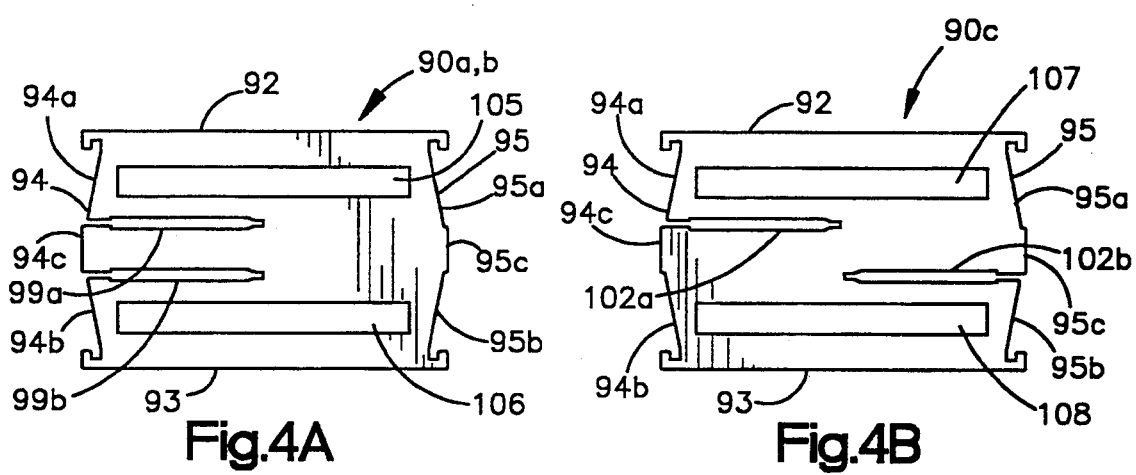

FLUID INDICATOR ASSEMBLIES FOR SIGHT FLOW APPARATUS

The present invention is a continuation-in-part of U.S. patent Ser. No. 07/747,263 for "Sight Flow Indicator With Cartridge", filed Aug. 19, 1991, now U.S. Pat. No. 5,249,464 which is incorporated herein by reference.

FIELD OF THE INVENTION

The present invention relates generally to fluid indicator assemblies for sight flow apparatus such as sight flow windows and sight flow indicators.

BACKGROUND OF THE INVENTION

Sight flow apparatus such as sight flow windows and sight flow indicators are known which allow visual inspection of fluid flow through a fluid system. These sight flow apparatus generally comprise a body which is formed from, e.g., cast iron, steel or bronze. The body has an inlet and an outlet which are attached, e.g. threaded, bolted, soldered or welded, in-line with fluid pipes cooperatively forming a fluid flow line in a manufacturing plant or other facility. Transparent window(s) mounted to the side of the body allow visual inspection of the fluid flow through the sight flow apparatus, and hence the fluid flow within the fluid flow line. For example, one type of sight flow apparatus is a high pressure sight flow indicator manufactured by the assignee of the present invention under the Model No. F-910-HP.

Some sight flow apparatus have a fluid device or indicator, e.g., a rotor or a flapper, installed within the body. The rotor provides an indication of the direction and magnitude of fluid flow within the sight flow apparatus by the direction and rate of rotation of the rotor; while the flapper provides an indication of the direction and magnitude of fluid flow by the direction of the flapper and the angle at which the flapper extends. The rotor or flapper can be rotatably mounted on an axle extending between and supported by the windows on the body of the indicator, by the body itself, or by a pair of alignment washers located within the body. An example of a sight flow apparatus having a pair of alignment washers which support the axle for a flapper or rotor is shown and described in U.S. patent application Ser. No. 07/747,263 for "Sight Flow Indicator with Cartridge", also assigned to the assignee of the present invention and which is incorporated herein by reference.

One known type of rotor for the above-mentioned sight flow apparatus comprises an assembly of Teflon tubes which can be rotatably mounted on the axle in the sight flow apparatus. A plurality of round Teflon "plugs" are inserted through holes in the tube extending perpendicular to the axis of rotation. The plugs extend outward from both sides of the tube and are oriented in angular offset relation to each other. When the rotor is mounted on the axle, the surface area of the plugs provides resistance to fluids flowing through the body of the sight flow apparatus, which thereby rotates the rotor. When viewed through the window of the sight flow apparatus, the rotor provides a visual indication of the fluid flow through the fluid flow line.

However, the above-described rotor has certain drawbacks in that the rotor only rotates across a certain limited range of fluid flow rates. More particularly, this type of rotor has a tendency to stop turning when the rate of fluid flow through the sight flow apparatus drops below a certain level. This is believed to be due to the relatively large mass of the rotor concentrated around the rotational axis, and the round shape of the rotor plugs.

Moreover, the plugs on this type of rotor tend to be located centrally in the body to take advantage of the maximum fluid flow within the body of the sight flow product. However, mounting the plugs centrally in the body makes it difficult to visually inspect the rotation of the rotor through the windows of the apparatus—particularly when the fluid flowing through the sight flow apparatus is cloudy or dark. Accordingly, this type of rotor lacks flexibility in being able to provide an indication of fluid flow over a wide range of flow rates and conditions.

Another known type of rotor for the sight flow apparatus described above comprises a one-piece, paddle-wheel type body having radially extending vanes, such as shown and described in Moore, et al, U.S. Pat. No. 3,185,128. The Moore rotor is mounted on an axle extending between the windows in a sight-glass indicator. The direction and magnitude of fluid flow are provided by visually inspecting the rate of rotation of the vanes, and in particular the rotation of the edges of the vanes, through the window in the sight glass indicator.

However, the edges of the vanes in this type of rotor have a limited surface area which is visible through the windows in the sight glass indicator. Accordingly, it can also be difficult to visually inspect the rotation of the rotor through the window in this type of apparatus. Moreover, with either of the rotors described above, the large mass of the rotor tends to create a substantial pressure drop through the sight flow apparatus, which can be unacceptable in some situations.

Additionally, the dies for the integrally molded rotor and rotor parts described above can be expensive to purchase and maintain. These dies do not have the flexibility to quickly and easily provide rotors with different dimensions to enable the rotors to be installed within a wide variety of sight flow apparatus.

One known type of flapper for the above-described sight flow apparatus is also shown in the Moore patent. The Moore flapper includes a hollow tube which is rotatingly supported by the axle in the sight glass indicator. The tube includes an integrally attached, wing-like member, which extends outwardly from the tube and provides resistance to fluids flowing through the sight flow apparatus. The flapper is designed to rotate into the direction of fluid flow to provide an indication of the direction and magnitude of the fluid flow within the fluid line.

The above described flapper, however, also has certain drawbacks. For example, the flapper can only indicate horizontal and vertically upward fluid flow through the sight flow apparatus. The flapper normally hangs downwardly due to the force of gravity and rotates into the direction of fluid flow when fluid is present in the fluid line. However, if the sight flow apparatus is connected within a vertical fluid line, the flapper will still normally hang downward, and will thereby give an indication that fluid is flowing downwards through the fluid line, whether it is or not. Additionally, the edges of the flapper have a limited surface area visible through the windows in the sight glass indicator. Further, the dies for the integrally molded flapper can be expensive to purchase and maintain and do not have the flexibility to quickly and easily provide flappers with different dimensions to enable the flappers to be installed within a wide variety of sight flow apparatus.

Accordingly, there is a constant demand in the industry for sight flow apparatus with improved fluid indicator assemblies, and in particular, for sight flow apparatus which have improved rotor and/or flapper assemblies that facilitate visually inspecting the fluid flow through a fluid system over a wide range of flow rates, conditions and orientations. There is also a constant demand in the industry for fluid indicator assemblies which are simple to manufacture and which can be assembled rapidly and easily for installation within a wide variety of sight flow apparatus.

SUMMARY OF THE INVENTION

The present invention provides new and useful fluid indicator assemblies for sight flow apparatus, and in particular, provides: (1) a new and useful rotor assembly which provides an indication of fluid flow across a wide range of fluid flow rates, yet minimizes the pressure drop through the sight flow apparatus; and (2) a new and useful flapper assembly which provides an indication of fluid flow through a sight flow apparatus regardless of whether the apparatus is mounted within a horizontal or vertical fluid line. Both the rotor assembly and the flapper assembly have indicator caps attached to at least one end which facilitate visually inspecting the flow rates through the sight flow apparatus over a wide range of conditions. Moreover, both the rotor assembly and the flapper assembly are constructed using techniques which make it simple and easy to provide rotor assemblies and flapper assemblies for a wide variety of sight flow apparatus.

According to the preferred form of the invention, the rotor assembly for the sight flow apparatus includes a plurality of lightweight, stainless steel or other chemically-resistant blades which interfit to form generally radially extending vanes. Each blade includes a pair of narrow slots which extend inwardly from one or both ends of the blade and enable the blades to be interconnected. The interconnected blades create a central aperture which allows the assembly to be mounted on the axle in the sight flow apparatus.

Each vane in the rotor assembly can have an opening of a predetermined dimension cut centrally through the blade depending on the anticipated fluid flow rate through the body of the sight flow apparatus. The vanes have enough surface area to cause the rotor to rotate over a wide range of fluid flow rates, yet the openings are large enough to minimize the weight and optimize fluid drag of the rotor assembly, and hence minimize the pressure drop within the fluid system. The vanes can also be formed without openings when weight and pressure drop are not significant considerations.

A flexible, preferably Teflon, indicator cap is attached adjacent each end of the rotor assembly. Each indicator cap includes pairs of grooves which cooperate with hooks on the edges of the blades to lock the interconnected blades together. Each indicator cap also has a central aperture to receive the axle to mount the interconnected blades of the rotor assembly in the sight flow apparatus.

When the rotor assembly is mounted within the sight flow apparatus, the indicator cap(s) prevent the ends of the metal blades from contacting alignment washer(s) supporting the axle in the sight flow apparatus, thus lowering frictional drag. Further, each indicator cap has a substantial visible surface area, which when coupled with the proximate relation of the indicator cap to the window(s) in the sight flow apparatus, facilitates visually inspecting the rotation of the rotor assembly across a wide range of fluid conditions.

The flapper assembly for the sight flow apparatus includes a lightweight, stainless steel or other chemically-resistant blade which is rotatably attached to the axle in the sight flow apparatus. Each end of the blade is preferably attached to the axle with a flexible, preferably Teflon, indicator cap. Each indicator cap includes a slot which receives a portion of the blade end, and a central aperture which receives the axle when the flapper assembly is mounted in the sight flow apparatus. Each indicator cap prevents the ends of the flapper blade from contacting the alignment washer(s) in the sight flow apparatus. Further, each indicator cap has a substantial visible surface area which, when coupled with the proximate relation of the indicator cap to the window(s) in the sight flow apparatus, facilitates visually inspecting the orientation of the flapper in the sight flow apparatus, across a wide range of fluid conditions.

The flapper assembly can also have a counterweight connected to the flapper blade to bias the flapper blade into predetermined orientations when the fluid flow approaches zero in the sight flow apparatus. The counterweight preferably comprises a stainless steel or other chemically-resistant block having an aperture to receive the axle, and one or more narrow slots. Each of the narrow slot(s) in the counterweight extends inwardly from the edges of the counterweight toward the axle aperture, and is designed to receive the flapper blade. The slot(s) in the counterweight is oriented at predetermined angles to locate the counterweight at different desired angular relationships relative to the flapper blade for a given flow condition. The flapper assembly can be assembled such that the flapper blade is biased by the counterweight into a horizontal or vertical orientation (or other defined angle) within the sight flow apparatus, depending upon the choice of slot in the counterweight.

Both the rotor assembly and the flapper assembly can be mounted on an axle within the body of the sight flow apparatus. The axle is preferably supported by a pair of orientation washers located in spaced-apart relation in the body of the sight flow apparatus. The washers are also preferably interposed between the ends of a cartridge in the apparatus and one (or more) window assemblies removably mounted to the sides or ends of the body. Each window assembly includes a transparent window, a retainer and fasteners to allow visual inspection of the fluid flow through the cartridge in the sight flow indicator, and hence the movement of the rotor assembly or flapper assembly therein. At least one window assembly can be removed to provide access to the interior of the body, and hence to allow removal and/or replacement of the rotor assembly or the flapper assembly.

Accordingly, it is a basic object of the present invention to provide improved fluid indicator assemblies for sight flow indicators which facilitate visually inspecting the fluid flow through a fluid system.

It is another object of the present invention to provide a sight flow apparatus having a rotor assembly which provides a visual indication of the direction and magnitude of fluid flow through the body of the sight flow apparatus over a wide range of fluid flow rates;

and which has a configuration which minimizes the weight and fluid drag of the rotor assembly and optimizes the pressure drop across the rotor assembly.

It is still another object of this invention to provide a sight flow apparatus having a flapper assembly which provides visual inspection of the direction and magnitude of fluid flow through the body of the sight flow apparatus regardless of whether the sight flow apparatus is mounted within a horizontal, vertical or other defined angle fluid line.

It is still another object of the present invention to provide a rotor assembly and a flapper assembly with enlarged indicator caps proximate the window(s) in the apparatus to facilitate visually inspecting the direction and magnitude of the fluid flow through the sight flow apparatus across a wide range of fluid flow conditions, and which prevent the rotor assembly and flapper assembly from contacting the alignment washer(s) in the sight flow apparatus.

It is yet another object of the invention to provide a rotor assembly and a flapper assembly which can be quickly and easily assembled and installed within a sight flow apparatus and which are manufactured using techniques which make it relatively simple and inexpensive to provide rotor assemblies and flapper assemblies for a wide variety of sight flow apparatus.

Further objects of the present invention will become apparent from the following detailed description and accompanying drawings which form a part of the specification.

BRIEF DESCRIPTION OF THE DRAWINGS

FIG. 1A is a front view of a sight flow apparatus illustrating a first type of rotor assembly mounted within the body of the sight flow indicator;

FIG. 1B is a cross-sectional side view of the sight flow apparatus taken substantially along the plane described by the lines 1B—1B of FIG. 1A;

FIG. 2A is a side view of the cartridge for the sight flow apparatus of FIG. 1A;

FIG. 2B is a cross-sectional view of the cartridge taken substantially along the plane described by the lines 2B—2B of FIG. 2A;

FIG. 3 is a front view of the alignment washer for the sight flow apparatus of FIG. 1A;

FIG. 4A is one type of blade for the rotor assembly for the sight flow apparatus of FIG. 1A;

FIG. 4B is another type of blade for the rotor assembly for the sight flow apparatus of FIG. 1A;

DETAILED DESCRIPTION OF THE PREFERRED EMBODIMENT

Figure 1C:
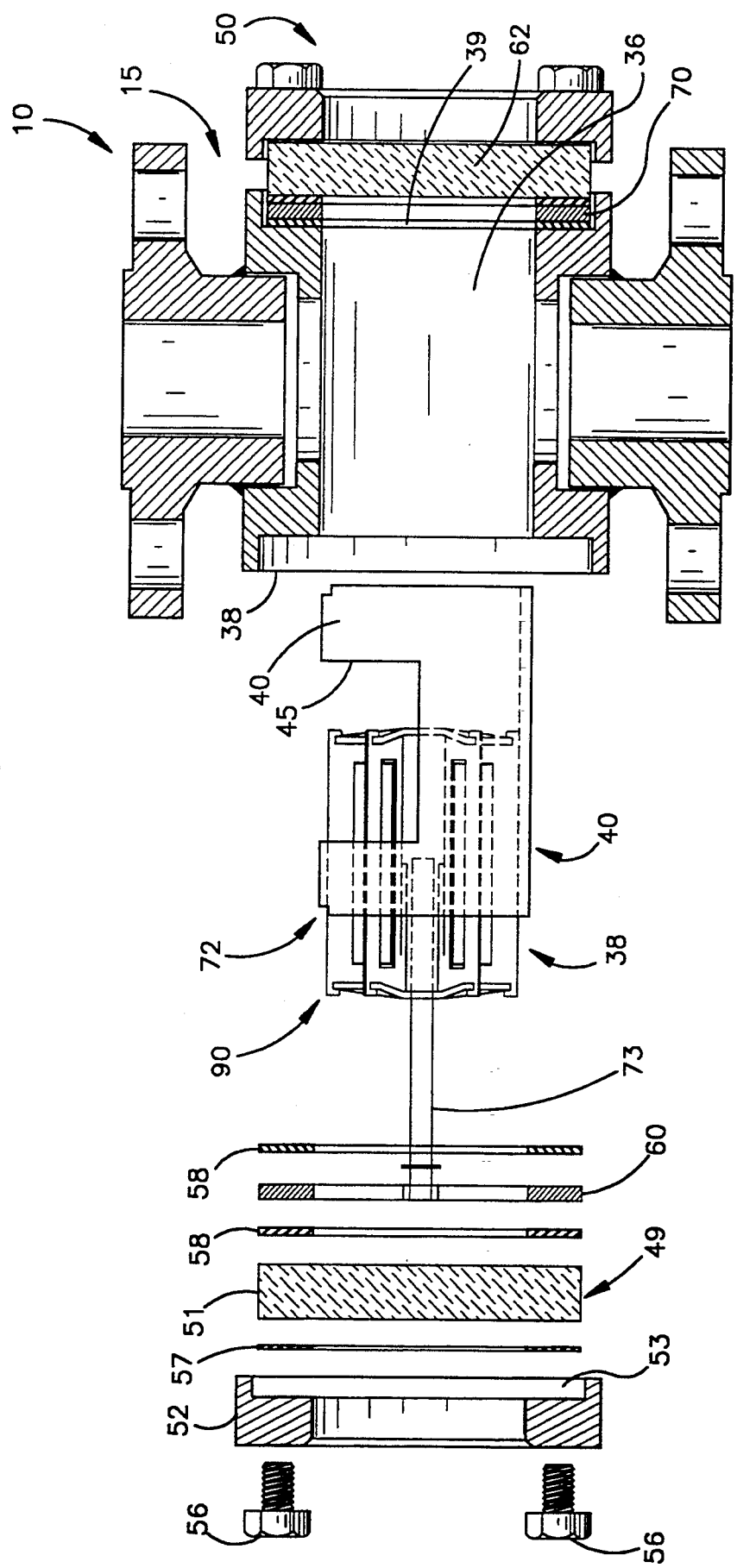
FIG. 1C is a partially assembled, crosssectional side view of the sight flow apparatus of FIG. 1A.

Referring to the drawings, and initially to FIGS. 1A–1C, a sight flow apparatus, indicated generally at 10, is designed to be connected in-line to fluid pipes 11 and 12 cooperatively forming a fluid flow line in a manufacturing plant or other facility. The sight flow apparatus 10 includes a body, indicated generally at 15, having an inlet bore 16, and an outlet bore 17. The body 15 is preferably formed from metal or plastic barstock, castings, moldings, fabrications or other appropriate material using techniques which are known to those skilled in the art.

FIG. 1B shows a fabricated body construction where the inlet and outlet bores 16, 17 of the body are preferably aligned with inlet and outlet bores 18 and 19 respectively, formed in flanges 20 and 21. Flanges 20, 21 each have a neck portion 22 which is received in a counterbore 23 formed in a wall of body 15. The flanges are welded at 24 to provide a fluid-tight enclosure. Each flange 20, 21 further includes circumferentially spaced holes 28 which are designed to receive fasteners respectively coupling flange 20 to the flange 29A of inlet pipe 11, and flange 21 to the flange 29B of outlet pipe 12.

Additionally, flanges 20, 21 can include a raised face 30 which is designed to locate and receive a gasket 31 to provide a fluid-tight seal between the body 15 and the flanges at the respective ends of the fluid-carrying pipes cooperatively forming the fluid line. It should be recognized by one skilled in the art that the flanges 20, 21 are only an example of end connections commonly used in sight flow apparatus. Alternate inlet and outlet constructions employ butt welded flanges, pipe threads, soldered, braze, socket weld and butt weld pipe ends, etc., to suit user piping connection requirements.

The bores 18, 19 of flanges 20 and 21 respectively, extend longitudinally therethrough and allow fluid to flow through the body of the sight flow apparatus. In particular, bore 18 is designed to direct fluid through inlet bore 16 into a generally cylindrical cavity 36 formed in body 15, while outlet bore 17 is designed to direct fluid out of cavity 36 and through bore 19 in flange 21. Although the inlet and outlet flanges 20 and 21 are illustrated as being formed separately from body 15, it is anticipated that the flanges 20, 21 and body 15 can also be formed integrally in one piece therewith.

The cavity 36 in body 15 comprises a generally cylindrical bore formed through the length of the body. The cavity extends substantially perpendicular to the inlet bore 18 of flange 20, and outlet bore 19 of flange 21. The cavity 36 in body 15 further includes open ends, indicated generally at 38, 39. The open ends 38, 39 are preferably designed to allow a generally tubular or cylindrical cartridge, indicated generally at 40, to be removably located within the cavity 36; however it should be apparent to those skilled in the art upon reading the specification that the present invention can also be used without a separate cartridge, that is, the body 15 and the cartridge can be formed integrally in one piece.

The tubular cartridge 40 has a wall which is designed to conform substantially to the cylindrical cavity 36 in body 15. As illustrated in FIGS. 2A and 2B, a section, indicated generally at 45, can be cut radially through the cartridge to enhance the flow characteristics through the cavity of the sight flow apparatus. The section 45 defines an inlet opening 42a and an outlet opening 42B (FIG. 2B) which direct the fluid flow through the cartridge, as will be described herein in more detail. The ends 46, 47 of the cartridge 40 are open to allow visual inspection of the interior of the cartridge and the flow therethrough.

Referring again to FIGS. 1A–1C, the sight flow apparatus preferably includes a pair of window assemblies, indicated generally at 49, 50, which enclose the cartridge 40 within cavity 36. Each window assembly 49, 50 includes a transparent window, a retainer and sealing structure. For example, window assembly 49 includes window 51 and retainer 52. Window 51 is shown as being partially located within and interposed between a first counterbore 53 formed in a retainer 52, and a second counterbore 54 formed in body 15. The counterbores are used to locate and partially enclose the window assembly 49. Retainer 52 includes a circular opening 55 formed in one piece therewith to enable visual inspection of the cavity in the body through the ends of the cartridge (see, e.g., FIG. 1A). The retainer further includes a plurality of holes (not shown) adjacent its corners which are designed to receive fasteners, e.g. bolts 56, to secure the window assembly 49 to the body 15. Alternatively, window assembly 49 can be retained to the body by a threaded cover plate received in a threaded second counterbore (not shown). In this case, male threads can be formed on the outside of the cover plate and cooperating female threads can be formed on the body to facilitate attaching the cover plate to the body.

A cushion 57 is compressed between the first counterbore or shoulder 53 in retainer 52 and the window 51, and a pair of gaskets 58 are compressed between window 51 and the second counterbore or shoulder 54 of body 15 to provide a fluid-tight seal between the retainer 52 and body 15. The gaskets 58 surround a first alignment washer 60, which is adapted to provide alignment for the cartridge and support for the fluid indicator caps mounted within the cartridge 40, as will be described herein in more detail.

The second window assembly 50 is formed similar to the first window assembly 49. More particularly, the second window assembly 50 includes a second window 62 partially located in a first counterbore 64 formed in a retainer 66 and in a second counterbore 65 formed in body 15. Retainer 66 is similarly removably attached to body 15 with fasteners 67 to hold window 62 tightly against the body 15, although a threaded cover plate could also be used to attach the window to the body of the apparatus, as indicated previously. A cushion 68 is located between first counterbore 64 in retainer 66 and window 62; while a second pair of (spaced) gaskets 69 surround a second alignment washer 70 and are compressed between window 62 and second counterbore 65 to provide a fluid-tight seal. Second window 62 is typically located opposite first window 52 on body 15 either on the ends or the sides of the sight flow apparatus.

The windows 51, 62 allow visual inspection of the fluid flow through the cavity 36, and hence through either end of the cartridge 40, if a cartridge is located within the cavity. In fact, window assemblies 49, 50 capture the cartridge 40 within the cavity 36 and locate and orient the cartridge within the sight flow apparatus. However, it is also within the scope of the invention to provide only a single window on the sight flow apparatus which would allow visual inspection through only one end of the cavity (and/or the cartridge in the cavity). In this case, a pair of alignment washers can still be used to locate and orient the cartridge, however, one alignment washer will be located adjacent an interior surface of the body of the sight flow apparatus. Other variations in construction of the sight flow apparatus should also be apparent to those skilled in the art.

To provide access to the cavity 36 in body 15 if a pair of windows are mounted on the apparatus, fasteners 56 and retainer 52 (or the threaded cover plate) are removed, along with cushion 57, window 51, alignment washer 60, and gaskets 58, from one end 38 of the body; or alternatively, fasteners 67 and retainer 66 (or the threaded cover plate) are removed, along with 15 cushion 68, window 62, alignment washer 70, and gaskets 69 from the other end 39 of the body. In the case where only a single window is mounted to the body of the sight flow apparatus, of course only a single retainer, window, cushion and gasket can be removed. In any case, ready and easy access is provided to the cavity in the body.

An axle 73 is mounted in the body of the sight flow apparatus. The axle 73 can be supported between apertures formed in the windows on opposite sides of the sight flow apparatus, for example as shown and described in Moore, U.S. Pat. No. 3,185,128; by apertures formed in opposite sides of the body itself; or preferably between a diametrically or radially extending spoke support 82 in a pair of alignment washers 60, 70 (FIGS. 1A–C, 3), such as described in U.S. patent application Ser. No. 07/747,263 entitled "Sight Flow Indicator with Cartridge", and assigned to the assignee of the present invention.

As shown in FIG. 3, each alignment washer 60, 70 comprises a generally ring-like frame 80 having the spoke support 82 extending radially inward toward the central axis thereof. When a cartridge is located within cavity 36 (FIGS. 1A–C), the base 83 of spoke support 82 is designed to receive an alignment notch in the cartridge (i.e., either alignment notch 95 or alignment notch 96 shown in FIG. 2A) to align the cartridge within the body of the sight flow apparatus. The spoke support 82 includes an outer distal end having a knob 84 with an aperture 86 formed therein for support of one end of the axle 73. Alternatively, although not shown, spoke support 82 can extend across the diameter of the ring-like frame 80 and be attached at both ends.

According to one aspect of the invention, a fluid indicator assembly 72 is rotatably mounted on axle 73. The fluid indicator assembly 72 can comprise a rotor assembly, indicated generally at 90, formed from a plurality of flat, planar blades preferably die-cut or otherwise formed from lightweight stainless steel or other rigid, non-corrosive material. It is preferred that the blades of the indicator assembly have identical peripheral dimensions, such that a number of blades can be cut (e.g., die-cut) or stamped simultaneously in a single step. Providing similar blades makes it quite simple to quickly change the cutting tools to make larger or smaller blades, depending upon the dimensions of the sight flow apparatus. Hence, as will become apparent, the present invention has a certain amount of flexibility in being able to provide a rotor assembly which can be installed within a wide variety of sight flow apparatus.

Preferably, the rotor assembly 90 includes three blades, for example blades 90a, 90b and 90c as illustrated in FIGS. 4A, 4B. Each blade (for example blade 90a) is preferably about 0.030 inches (1.0 mm) thick, and includes a front edge 92, rear edge 93, and opposite ends 94, 95. The front and rear edges 92, 93 extend substantially parallel to each other, while ends 94, 95 also extend substantially parallel to each other, but preferably have an outwardly-tapered shape. More particularly, end 94 has a first tapered portion 94a and a second tapered portion 94b which are interconnected by a flat central portion 94c. Similarly, end 95 has a first tapered portion 95a and a second tapered portion 95b which are interconnected by a flat central portion 95c. Blades 90b and 90c have similar tapered portions.

Blades 90a and 90b include a pair of slots 99a, 99b, cut lengthwise through substantially half of the blade at predetermined locations. The slots 99a, 99b extend axially inward from one end (e.g., end 94 (FIG. 4A)) and are preferably located at the points where the angled portions 94a, 94b intersect the flat central portion 94c. The third blade 90c (FIG. 4B) also has a pair of slots 102a, 102b which extend axially inward to substantially the halfway point of the blade. However, slot 102a extends inwardly from end 94, while slot 102b extends inwardly from the other end 95. The slots in the blades can be formed in subsequent manufacturing steps by cutting (e.g., die-cutting). Since the slots in blades 90a and 90b are preferably formed in the same location, the cutting step for the slots can be performed simultaneously in a number of blades.

The blades interfit easily and simply to form the rotor assembly 90. To this end, the first blade 90a is aligned with the third blade 90c such that the slot 99a in the first blade 90a interfits with a corresponding slot 102a in third blade 90c; and the blades are slid together until the inner ends of the slots meet and the blade ends 94, 95 are substantially flush (see e.g., FIG. 6).

Figure 6:
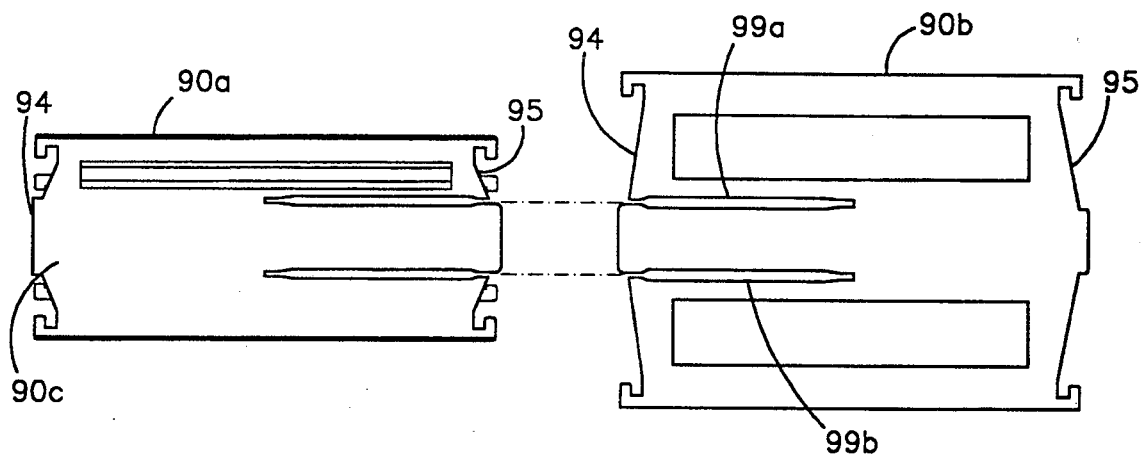
FIG. 6 is a partially assembled view of the rotor assembly, illustrating two of three blades interconnected.

After the first and third blades are interconnected, it should be apparent that the remaining slots (99b, 102b) in blades 90a, 90c extend outwardly in the same direction (see FIG. 6). The second blade 90b is then aligned with the first and third blades such that slots 99a, 99b in the second blade 90b interfit with the slots 99b, 102b in the first and third blades respectively. The second blade 90b is then slid together with the first and third blades until the ends of the second blade are substantially flush with the ends on the first and third blades (see, e.g., FIGS. 7A, 7B).

In this manner, each blade is interconnected between the other two blades to form a stable geometric (i e., "star-shaped") form. The interconnected blades form a plurality of vanes which extend radially outward from the geometric axis of the assembly at approximately a 60° offset from each other. The dimensions of the blades are chosen such that the blades extend across slightly less than the full diameter of the cavity 36. Additionally, the interconnected blades form a central, "triangular" aperture, indicated generally at 104, to allow the rotor assembly to be easily mounted on the axle 73, as will be described herein more detail.

As shown in FIGS. 4A and 4B, a pair of lengthwise extending fluid openings can be die-cut or stamped in each blade. For example, a first opening 105 can be die-cut lengthwise between tapered portion 94a on end 94 and tapered portion 95a on end 95, and between slot 99a and edge 92. Likewise, a second opening 106 can be die-cut lengthwise between tapered portion 94b on end 94 and tapered portion 95b on end 95, and between slot 99b and edge 93. For blade 90c, a first lengthwise extending opening 107 can similarly be die-cut or stamped between tapered portions 94a, 95a, and between slot 102a and edge 92. A second lengthwise extending opening 108 can similarly be formed between tapered portions 94b, 95b and between slot 102b and edge 93.

The openings described above are located on the blades such that when the blades are interconnected (FIG. 7a), an opening extends generally centrally across each individual vane. However, it is also to be anticipated that more than one opening could be formed in each vane. In any case, the openings minimize the weight of the rotor assembly, and optimize the resistance to fluid flow through the sight flow apparatus. This optimized resistance to fluid flow optimizes the pressure drop across the rotor assembly, and hence within the fluid line.

Moreover, locating a substantial portion of the area of each blade toward the edges of the blade imparts the greatest amount of momentum from the fluid to the rotor assembly when rotating, and hence minimizes the effect of any friction caused by rotation on the axle. Additionally, fluid can also flow through the openings to minimize the pressure drop across the assembly. The dimensions of the openings are thus chosen depending on the fluid flow rate through the sight flow apparatus and the amount of pressure drop which is acceptable through the rotor assembly. The dimensions can easily be determined by analysis or simple experimentation which should be well within the knowledge of those skilled in the art.

Figure 5A:
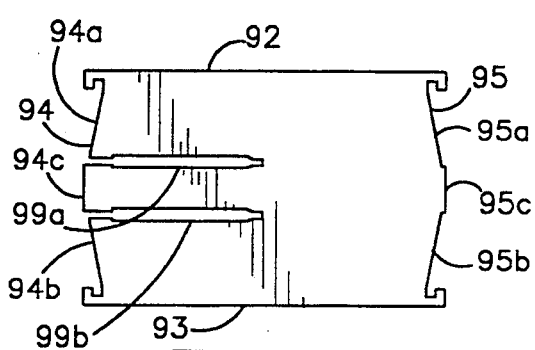
FIG. 5A is a blade similar to FIG. 4A but without fluid apertures formed therein.
Figure 5B:
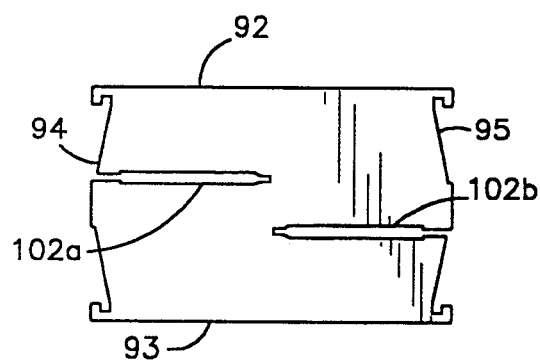
FIG. 5B is a blade similar to FIG. 4B but without fluid apertures formed in the blade.

However, for a lower flow rate, where a pressure drop is either inconsequential or within acceptable limits, solid blades can be used that do not have openings formed therein, as illustrated in FIGS. 5A and 5B. In all other aspects, these solid blades are constructed identically to the blades illustrated in FIGS. 4A and 4B and are interconnected in the same fashion.

Figure 7A:
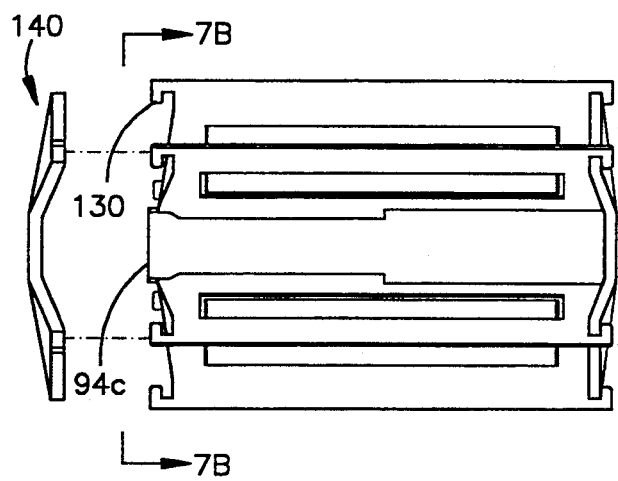
FIG. 7A is a partially assembled view of the rotor assembly, illustrating three blades interconnected and an indicator cap connected to one end of the rotor assembly.
Figure 7B:
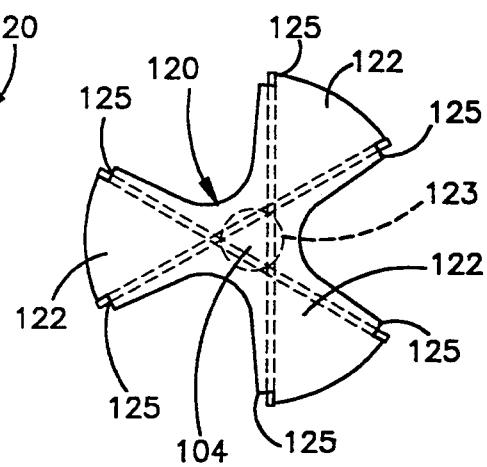
FIG. 7B is an end view of the partially assembled rotor assembly (taken substantially along the plane described by the lines 7B—7B) of FIG. 7A.

To lock the blades 90a, 90b, 90c together in this interconnected relationship, a first indicator cap, indicated generally at 120 in FIG. 7A and 7B, is attached to one end of the rotor assembly; while a second indicator cap, indicated generally at 140, is attached to the other end of the rotor assembly. The indicator caps comprise flat pieces of flexible Teflon or other non-corrosive material having a thickness of about 0.062 inches (1.5 mm). Each indicator cap is stamped or die-cut with a plurality of petal-like appendages 122 which extend outwardly at approximately 120 degree intervals, and a central aperture 123 (FIG. 7B) which is designed to receive the axle 73.

Each petal-like appendage 122 on the indicator cap includes a pair of stepped shoulders 125 formed on the distal end thereof, with one stepped shoulder being formed on the opposite distal corner of the appendage from the other stepped shoulder. The stepped shoulders on the ends of each appendage are designed to lock under hooks 130 formed toward the edges of each vane in the interconnected blade assembly. The hooks 130 on each blade extend outwardly from the edges of the blade and inwardly toward the central portion of the blade. The outward extent of the hooks is approximately the same as the outward extent of the flat, central portion 94c of the blade (see e.g., FIG. 7A), and hence the hooks are relatively flush with the central portion of each blade.

In attaching the indicator caps to the ends of the blades, each indicator cap is bent along the tapered portions 94a, 94b on the ends of the blade and the distal ends of the appendages are forced under the hooks at the edges of the blades. The width of each appendage is chosen such that the stepped shoulders on each appendage engages a corresponding hook on adjacent blades, and hence each appendage extends between the ends of two adjacent blades. The indicator cap can be flexed slightly when installed such that each appendage is locked under a corresponding hook in adjacent vanes to create a stable structure.

The central portion of the indicator cap is forced outwardly to a small degree because of the outwardly extending central portion 94c (or 95c) on the ends of the blades. Since the hooks on the ends of the blades are flush with the central portion of the blades, the central portion of the indicator cap is actually forced outwardly to a greater degree than the hooks on the ends of the blades. Hence, because of the outwardly extending central portion of the indicator cap, the blades, and in particular the hooks on the ends of the blades, will not contact the alignment washer (or the windows) in the sight flow apparatus when the rotor assembly is turning. The indicator cap therefore not only improves the rotational characteristics of the rotor assembly on the axle, but allows the rotor assembly to rotate without the blades rubbing against the alignment washers or the windows in the sight flow apparatus.

The rotor assembly can thus be quickly and easily mounted on the axle within the sight flow apparatus when the window(s) in the apparatus are removed. The rotor assembly is mounted within the apparatus such that the axle extends through an aperture in at least one indicator cap, through the axle aperture formed by the blades, and preferably also through the aperture formed by the other indicator cap. When the rotor assembly is mounted in the sight flow apparatus, each indicator cap is located proximate a window to facilitate visually inspecting the fluid flow through the sight flow apparatus. The proximate relation of the indicator cap to the window, and the larger dimension of the cap in profile than the edge of the blade, facilitates inspecting the fluid flow through the apparatus.

Moreover, the indicator caps improve the rotational characteristics of the rotor assembly within the sight flow apparatus and hence minimize the friction between the rotor assembly and the alignment washers. A Teflon or otherwise non-corrosive washer 113 (FIG. 1C) can also be interposed between each indicator cap and the alignment washer of the sight flow apparatus to further improve the rotational characteristics of the rotor assembly.

Figure 8A:
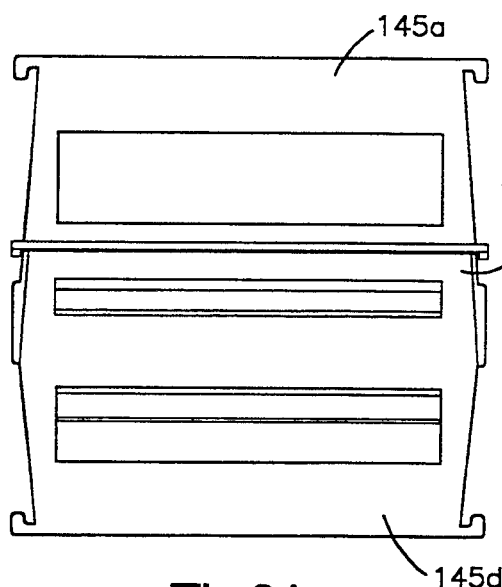
FIG. 8A is a side view of the rotor assembly constructed with five blades.
Figure 8B:
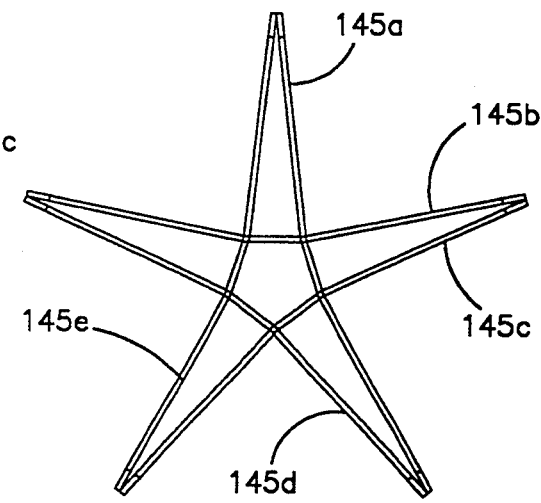
FIG. 8B is an end view of the rotor assembly of FIG. 8A.

Additionally, it should be apparent to those of ordinary skill in the art that the number of blades illustrated in the figures is only exemplary, and that more (or less) than three blades can be interconnected to form the rotor assembly. For example, as illustrated in FIGS. 8A, 8B, a series of five blades 145a–145e can be interconnected in the same fashion as described above. More particularly, four of the five blades (e.g., blades 145a–145d) can have a pair of slots which extend inwardly from one end of the blade, while the fifth blade (e.g., blade 145e) can have slots which extend inwardly from both ends of the blade. If necessary, the blades can be bent outwardly (e.g., lengthwise along the slots) such that the blades tightly interconnect with each other when they are interfitted together. A pair of openings can be formed in each blade to reduce the weight of the blades and optimize the pressure drop across the assembly, such as described previously.

Figure 9A:
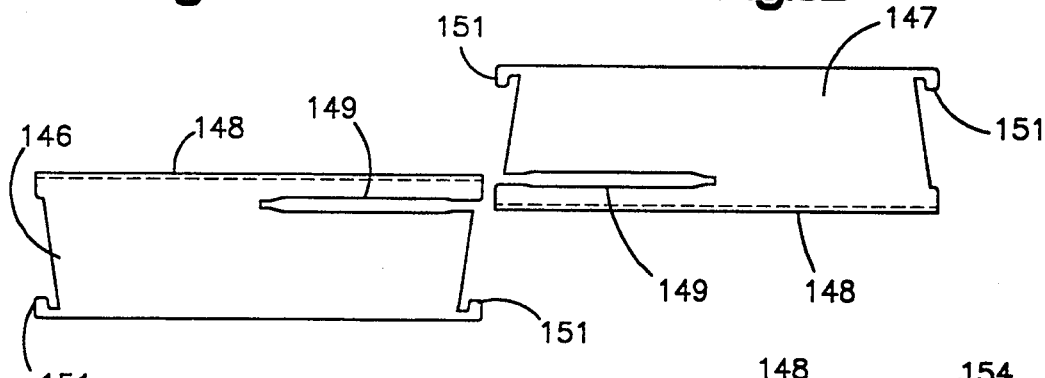
FIG. 9A is a side, partially assembled view of a rotor assembly constructed according to a second embodiment of the invention.
Figure 9B:
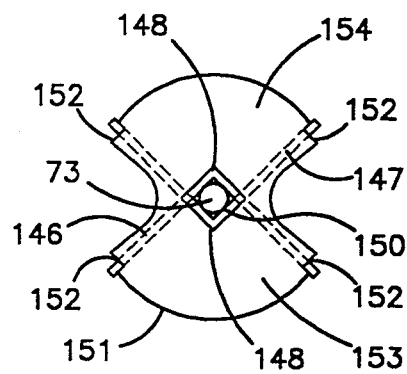
FIG. 9B is an end view of the rotor assembly of FIG. 9A.

Still further, as shown in the embodiment illustrated in FIG. 9A and 9B, other variations in the blade design can be realized without departing from the overall scope of the invention. More particularly, according to this embodiment, a pair of blades 146, 147 can be bent lengthwise along axis 148 such that the vanes on each blade extend substantially perpendicular to each other (see FIG. 9B). Each blade can have a pair of slots 149 extending axially inward from one edge of the blade to allow the blades to be interconnected in substantially the same manner as described previously. The interconnection of the blades creates an aperture 148 (FIG. 9B) for receiving the axle 73 such that the rotor assembly can be mounted on the axle within the sight flow apparatus.

All other design aspects of the blades in this embodiment are the same as described previously with respect to FIGS. 4A, 4B, 5A and 5B. More particularly, each blade has hooks 151 formed along each edge which receive a stepped shoulder 152 formed on the indicator cap (one of which is shown at 151) to lock the blades together. As shown in FIG. 9B, each indicator cap can have a pair of .petal-like appendages 153, 154 which correspond substantially to the angular offset of the blades. Although not shown, the blades can have lengthwise extending openings formed therein such as described previously. In this embodiment, the vanes on the interconnected blades extend outwardly at approximately 90° offset from each other.

Figure 10:
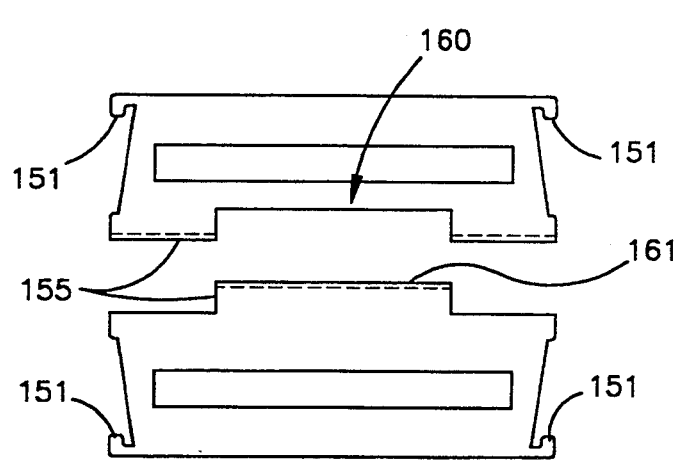
FIG. 10 is a side, partially assembled view of a rotor assembly constructed according to a third embodiment of the present invention.
Figure 11:
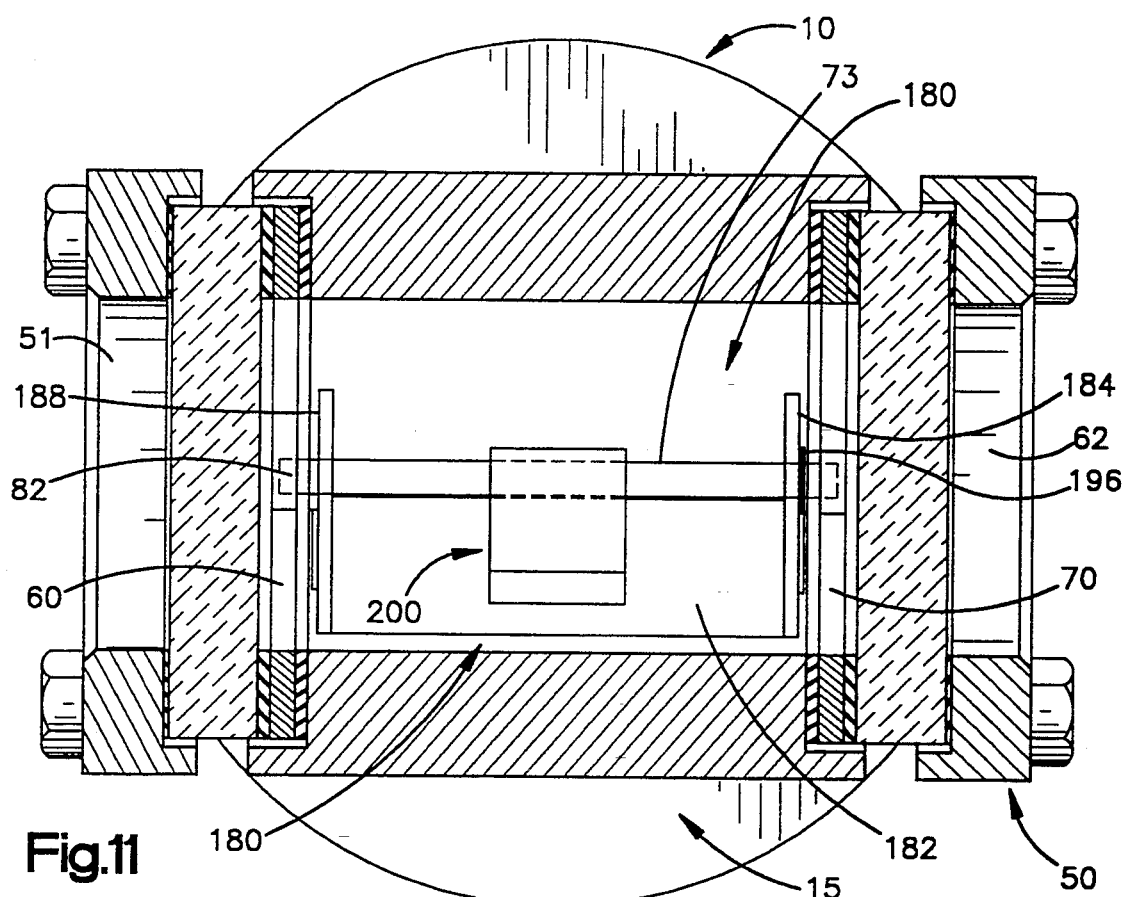
FIG. 11 is a cross-sectional side view of the sight flow indicator of FIG. 1A illustrating a flapper assembly mounted within the body of the sight flow apparatus.

Finally, as illustrated in FIG. 10, another embodiment of the rotor assembly is shown comprising a pair of blades which are folded lengthwise along axis 155 such that the vanes extend substantially perpendicular to each other. However, in this embodiment, a groove, indicated generally at 160, can be die-cut from the center of one of the pair of blades; while a tab, indicated generally at 161, can be die-cut in the center portion of the other of the pair of blades. In this embodiment, the inwardly extending slots described previously are not necessary to interconnect the blades. Rather, the tab 160 on the one folded blade is inserted within the groove 161 in the other folded blade. An end view of this rotor assembly is similar to that shown in FIG. 9B. To retain the pairs of blades together, the assembly is mounted on axle 73 (FIG. 9B) to interconnect the two blades. An indicator cap (such as described previously) can then be attached along the ends of the blade assembly to lock the blades together. In all other respects, the blades described with respect to FIGS. 9A, 9B and 10 are identical to the blade described previously with respect to FIGS. 4A, 4B and 5A, 5B.

Referring now to FIGS. 11–15, the fluid indicator assembly can also comprise a flapper assembly, indicated generally at 180. The flapper assembly 180 preferably comprises a single lightweight stainless steel or otherwise non-corrosive blade 182 which is rotatingly mounted on the axle 73 in the sight flow apparatus. As described previously, the axle 73 extends between and is rotatably supported by the spoke supports 82 on the alignment washers 60, 70 located on opposite sides of body 15, by the windows, or by the sight flow apparatus itself on either one or both sides. The flapper assembly 180 can be used with or without a cartridge, such as also described previously.

Figure 12:
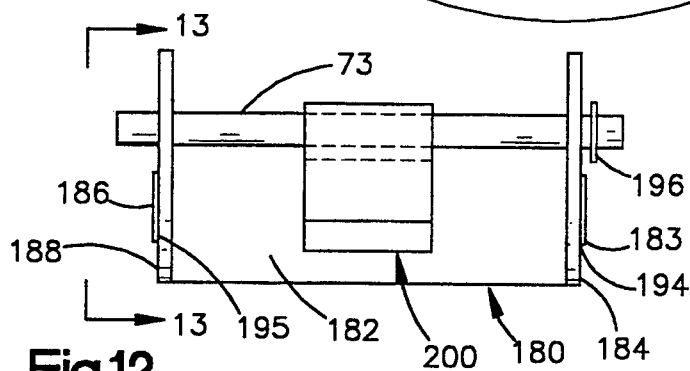
FIG. 12 is a top view of the flapper assembly for the sight flow apparatus of FIG. 11.
Figure 13:
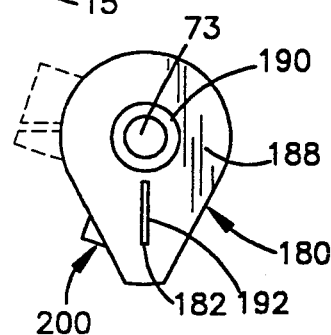
FIG. 13 is an end view of the flapper assembly of FIG. 12, showing the counterweight in a first position and illustrating (in phantom) the counterweight in a second position.

Each end of the blade 182 for the flapper assembly is coupled to the axle with an indicator cap. For example, blade end 183 is coupled to the axle with indicator cap 184, while blade end 186 is coupled to the axle with indicator cap 188. Each indicator cap is formed (e.g., die-cut) from a flat piece of Teflon or other non-corrosive material and includes an aperture 190 (FIG. 13) to receive the axle 73. Each indicator cap also includes a slot 192 which receives a portion of the blade end and cooperates with a radially-extending groove formed along each end of the blade to couple the blade to the axle. For example, slot 192 in indicator cap 188 receives a portion of blade end 186 and cooperates with groove 195 formed on the end of the blade to couple the end of the blade to axle 73. Indicator cap 184 has a similar slot which receives a portion of blade end 183 and which cooperates with groove 194 on the other end of the blade to couple the other end of the blade to the axle. As illustrated in FIG. 12, each indicator cap is inserted into a respective groove to, in essence, form a spring lock with the blade.

Further, a retaining ring washer 196 can be mounted near one end in a groove (not shown) in the axle 73 to center it and the flapper assembly 180 between the alignment washer(s). Washer 196 can be interposed onto axle 73 between each blade end and the alignment washer(s) in the sight flow apparatus to further reduce contact, minimize the friction between the flapper assembly and the alignment washer(s) of the sight flow apparatus, and limit the movement of axle 73. Moreover, each indicator cap also has a substantial surface area which, when coupled with the proximate relation of the indicator cap to the window(s) in the apparatus, facilitates visually inspecting the orientation of the flapper in the sight flow apparatus.

Figure 14:
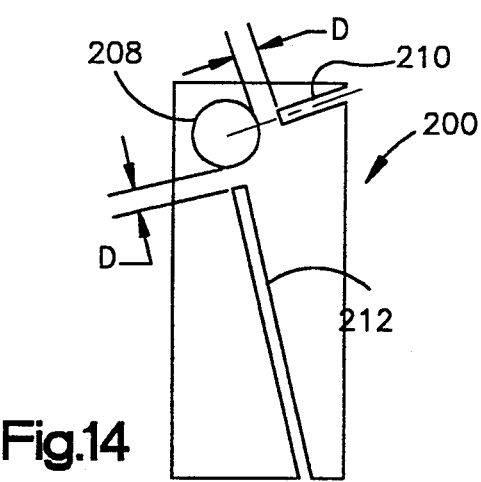
FIG. 14 is an end view of the counterweight for the flapper assembly of FIG. 12.
Figure 15:
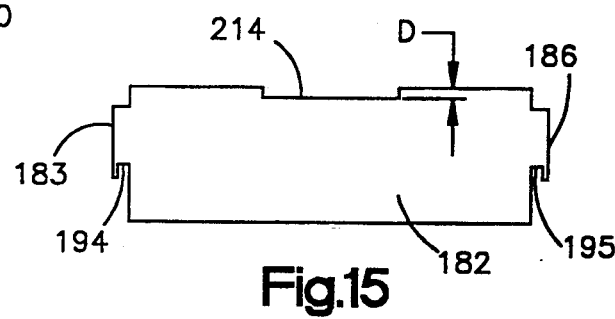
FIG. 15 is a top view of the blade for the flapper assembly of FIG. 12.

Additionally, the flapper assembly has a counterweight, indicated generally at 200, which is designed to bias the flapper into a predetermined orientation. To this end, the counterweight comprises a stainless steel or other chemically-resistant block having a predetermined weight and size which will be described herein in more detail. As shown in FIG. 14, the counterweight 200 includes an axle aperture 208 to receive the axle 173, and one or more narrow slots, for example slots 210 and 212, which extend inwardly from the edges of the counterweight toward the axle aperture and are designed to receive the flapper blade.

The slots 210, 212 are located at predetermined angles to locate the counterweight at different orientations relative to the plane of the flapper blade. More particularly, the flapper blade is initially located within one of the slots 210, 212 on the counterweight prior to installation within the sight flow apparatus. The indicator caps 184, 188 are then attached to the ends 183, 186 respectively, on the flapper blade 182, with the grooves 194, 195 in the flapper blade being received within the slots in each indicator cap.

A wide, shallow notch 214 is formed centrally along the inner edge of the flapper blade to locate the counterweight in the center of the blade. The depth "D" of the notch 214 in the flapper blade 182 is approximately the same as the distance "D" between the axle aperture 208 and the grooves 210, 212, such that the inner edge of the flapper blade is located proximate to the axle when the flapper assembly is fully assembled. Thereafter, the axle 73 is slid through indicator cap apertures 190 and counterweight aperture 208, and a retaining ring washer 196 is assembled onto both ends of axle 73, completing the flapper assembly.

The choice of slot 210 or 212 (or other predetermined slots) in assembling the counterweight with the flapper blade determines the bias of the flapper blade. In particular, the flapper assembly can be assembled such that the flapper blade is biased by the weight of the counterweight into either a substantially horizontal, vertical, or other desired orientation within the sight flow apparatus, depending upon which slot in the counterweight the flapper blade is located. For example, to provide a horizontally extending blade, the flapper blade is inserted within slot 210 when the flapper assembly is assembled. The counterweight will thereby bias the flapper assembly into substantially a horizontal orientation when the flow rate approaches zero in the fluid line. Such an orientation would typically be used when the sight flow apparatus is mounted within a vertical fluid line. However, when fluid flows upwardly or downwardly through the sight flow apparatus, the flapper assembly will rotate into the direction of fluid flow to allow visual inspection of the flow rate and direction.

Similarly, when the flapper blade is inserted within slot 212, the counterweight will bias the flapper assembly into a vertical orientation when the flow rate approaches zero in the fluid line. Such an orientation would typically be used when the sight flow apparatus is mounted within a horizontal fluid line. When fluid flows forwardly or backwardly through the fluid line, the flapper assembly will rotate into the direction of fluid flow to thereby allow visual inspection of the flow rate and direction. The particular slot angles and weight of the counterweight are determined from simple analysis, experimentation and calculation which should be well within the knowledge of those skilled in the art.

Other orientations of the counterweight are also within the scope of the present invention, such as if the sight flow apparatus included a 90° bend. In this case, the counterweight can have slots oriented to bias the flapper normally into an orientation between the inlet and outlet of the sight flow apparatus, such that flow in either direction would rotate the flapper into the direction of fluid flow. Additionally, the sight flow apparatus can be connected in a fluid line which extends at a 45° angle, in which case the slots could be formed in the counterweight to bias the flapper 90° offset from the inlet and the outlet. In any case, the flapper assembly is easily assembled and installed within the sight flow apparatus, and can be easily reassembled with the counterweight in a different orientation if necessary.

Flapper assembly 130 thereby provides a visual indication of the direction and magnitude of fluid flow within the sight flow indicator as the flapper rotates into the direction of fluid flow. Upon visual inspection through either of windows 51, 62, the pivotal movement of flapper assembly 180, and in particular the indicator caps 184, 188, on the flapper assembly, provide a quick and easy indication of the direction and magnitude of fluid flow within the sight flow indicator 10 is provided.

Additionally, for cartridge-based sight flow indicators, the cartridge can be rotated within the body of the indicator, and thereby the direction of fluid flow through the openings in the cartridge can be adjusted. Hence, the fluid indicator assemblies, and in particular the rotor assembly 90 illustrated in FIGS. 1A–1C, can operate more effectively over a wide range of fluid rates. More particularly, by rotationally orienting the openings 42a, 42b (FIGS. 2A, 2B) of the cartridge within the cavity relative to the openings 16, 17 in the body such that portions of the openings 16, 17 are blocked, higher velocity flow actuates the fluid indicator assemblies at lower than normal flow rates. Conversely, adjusting the cartridge for greater opening at 42a, 42b, reduces the pressure drop across the sight flow apparatus at higher than normal flow rates. Consequently, inserting a cartridge within the cavity 36 and adjusting the rotational orientation of the inlet and outlet of the cartridge with respect to the sight flow indicator increases the flexibility of the sight flow indicator by allowing inspection of a wider variety of flow rates in fluid pipes.

Accordingly, in any of the embodiments illustrated above, the rotor assembly and flapper assembly are constructed such that they can be easily removed and/or replaced from the sight flow apparatus when it is desired to change the type of fluid indicator assembly or when the fluid indicator assembly is damaged or broken, without removing the entire sight flow apparatus from its in-line connection. The techniques for manufacturing the rotor and flapper assembly make it simple and easy to install the assemblies within a wide range of sight flow indicators.

Still further, the rotor assembly provides an improved visual indication of the direction and magnitude of fluid flow through the body of the sight flow apparatus over a wide range of fluid flow rates; has a configuration which minimizes the weight of the rotor assembly and the pressure drop across the rotor assembly; and although constructed primarily of metal components, does not contact the window(s) in the sight flow apparatus.

Finally, the flapper assembly provides an improved visual indication of the direction and magnitude of fluid flow through the body of the sight flow apparatus over a wide range of fluid flow rates; has a configuration which minimizes the weight of the rotor assembly and the pressure drop across the rotor assembly; and although constructed primarily of metal components, also does not contact the window(s) in the sight flow apparatus.

Although the invention has been shown and described with respect to a certain preferred embodiment, it is obvious that equivalent alterations and modifications will occur to others skilled in the art upon their reading and understanding of the specification. For example, the principles of the present invention could be used for fluid analyzing instruments employing window assemblies, such as turbidimeters, nephelometers, calorimeters, and cartridge valves employing a window assembly for fluid access, if desired. Additionally, the above-described apparatus can also be mounted to tanks, containers or other instruments within the fluid system, in addition to the fluid line described previously. The present invention includes all such equivalent alterations and modifications, and is limited only by the scope of the following claims.

What is claimed is:

1. A fluid indicator assembly for a sight flow apparatus, wherein the sight flow apparatus includes a body having at least one transparent window for visually inspecting the fluid flow through the apparatus, the fluid indicator assembly comprising:

a fluid indicator suspended within said body transverse to the fluid flow and movable responsive to the fluid flow through the apparatus, at least one indicator cap attached to an end of said fluid indicator and movable therewith, and an axle received in an aperture in said at least one indicator cap to rotatably support said indicator cap, said axle being supported by apertures in opposite sides of said body, said at least one indicator cap being located between said end of said fluid indicator and said window when said axle is attached to said body for facilitating visual inspection of the orientation of said fluid indicator within the body.

2. A fluid indicator assembly as in claim 1, wherein said fluid indicator comprises a flapper assembly, wherein said at least one indicator cap is connected to at least one end of said flapper assembly to couple said flapper assembly to the axle, and further including a counterweight affixed to said flapper assembly, said counterweight having mean to connect said counterweight to said flapper assembly in a first orientation relative to said flapper assembly, said counterweight normally biasing said flapper assembly into a first direction when the fluid flow rate approaches zero in said body, and allowing said flapper assembly to move into the direction of fluid flow through said body, said counterweight also having means to connect said counterweight to said flapper assembly in a second orientation relative to said flapper assembly to normally bias said flapper assembly into a second direction when the fluid flow rate approaches zero in said body.

3. A fluid indicator assembly as in claim 1, wherein said fluid indicator is a rotor assembly comprising a plurality of blades interconnected in offset relation to each other to form an assembly of substantially radially extending vanes, said interconnected blades defining an axle aperture for receiving said axle, each of said blades comprising a substantially flat, planar sheet of material having a pair of slots extending inwardly from at least one end of the blade, each of said blades being interconnected such that one of the slots from one blade interfits with a corresponding slot from an adjacent blade, said at least one indicator cap having shoulder which cooperates with a corresponding hook on each of said blades to couple each of said blades together.

4. A fluid indicator assembly as in claim 2, wherein said counterweight comprises a block having an aperture to receive said axle, and wherein said at least one indicator cap has a larger profile than said block in a direction of visual inspection perpendicular to a plane containing said at least one window when said at least one indicator cap is attached to said blade.

5. A sight flow apparatus, comprising:

a body attached within a fluid line, said body having an interior cavity and at least one transparent window for visual inspection of fluid flow through said interior cavity, a fluid indicator assembly rotatably attached to said body within the cavity of said body, said fluid indicator assembly including a blade rotatable into predetermined orientations depending on the fluid flow through the body, and at least one indicator cap attached to said blade and rotatable therewith into said predetermined orientations, said at least one indicator cap being located between an end of said blade and said at least one window for facilitating visual inspection of the orientation of said blade within the body.

6. A sight flow apparatus as in claim 5, wherein said fluid indicator assembly is rotatably attached to an axle mounted to the body of the sight flow apparatus.

7. A sight flow apparatus as in claim 6, wherein said at least one indicator cap comprises a flat piece of non-corrosive material attached to said blade.

8. A sight flow apparatus as in claim 6, wherein said at least one indicator cap includes an aperture to receive said axle, and a slot which cooperates with said blade to support said blade within said body.

9. A sight flow apparatus as in claim 6, wherein said at least one indicator cap includes an aperture to receive said axle, and shoulders which cooperates with hooks on said blade to lock said indicator cap to said blade.

10. A sight flow apparatus as in claim 6, wherein said fluid indicator assembly includes a counterweight and means to connect said counterweight to said blade in a first orientation relative to said blade, said counterweight normally biasing said blade into a first direction when the fluid flow rate approaches zero in said body, and allowing said blade to move into the direction of fluid flow through said body.

11. A sight flow apparatus as in claim 10, wherein said counterweight further includes means to connect said counterweight to said blade in a second orientation relative to said blade different from said first orientation, said counterweight biasing said blade into a second direction when the fluid flow rate approaches zero in said body, and allowing said blade to move in the direction of fluid flow through said body when fluid is present in said body.

12. A sight flow apparatus as in claim 11, wherein said counterweight comprises a block having an aperture to receive said axle, and the means to connect said counterweight to said blade in said first and second orientations comprises a pair of slots, each of said slots receptive of said blade depending on the orientation of said counterweight with respect to said blade.

13. A sight flow apparatus as in claim 6, wherein said at least one indicator cap comprises a pair of indicator caps each connected to an opposite end of said blade and each having an aperture for receiving said axle to support said blade within the sight flow indicator.

14. A sight flow apparatus as in claim 13, wherein each indicator cap is comprised of a flat piece of non-corrosive material supported in proximate relation to said at least one window in said sight flow apparatus.

15. A sight flow apparatus as in claim 14, wherein said at least one window comprises a pair of windows to allow visual inspection of the fluid flow through said body, each of said indicator caps being located proximate to a respective window to allow visual inspection of the orientation of said blade within said body.

16. A sight flow apparatus as in claim 6, wherein said fluid indicator assembly includes a plurality of substantially planar blades interconnected in offset relation to each other to form an assembly of substantially radially extending vanes, said interconnected blades defining an axle aperture for receiving said axle.

17. A sight flow apparatus as in claim 16, wherein each of said blades includes a pair of slots extending inwardly from at least one end of the blade, said blades being interconnected such that one of the slots from one blade interfits with a corresponding slot from an adjacent blade.

18. A sight flow apparatus as in claim 17, wherein one of said plurality of blades includes a slot extending axially inward from each end of the blade, and the remainder of said blades includes slots extending axially inward from only one end of the blade.

19. A sight flow apparatus as in claim 18, wherein said indicator cap includes at least one aperture to receive said axle, and shoulders which cooperate with corresponding hooks on each of said blades to couple each of said blades together, each indicator cap being supported in proximate relation to said at least one window to facilitate visual inspection of the fluid flow through said body.

20. A sight flow apparatus as in claim 19, wherein each indicator cap is comprised of a flat piece of non-corrosive material.

21. A sight flow apparatus as in claim 20, wherein said fluid indicator assembly comprises three interconnected blades.

22. A sight flow apparatus as in claim 20, wherein said fluid indicator assembly comprises five interconnected blades.

23. A sight flow apparatus as in claim 6, wherein said fluid indicator assembly comprises two interconnected blades, each of said two interconnected blades comprising a planar sheet of material bent along an axis which bisects the area of said planar sheet at approximately a right angle to form a pair of panels extending in substantially perpendicular relation to each other, and each of said blades including a slot extending laterally from one end of each blade partially along the length thereof, said blades being interconnected such that each slot on a blade engages a corresponding slot on the other blade and such that said interconnected blades form an axle aperture to receive said axle.

24. A sight flow apparatus as in claim 23, wherein said indicator cap includes at least one aperture to receive said axle, and shoulders which cooperates with corresponding hooks on each of said blades to couple each of said blades together, each indicator cap being supported in proximate relation to said at least one window to facilitate visual inspection of the fluid flow through said body.

25. A sight flow apparatus as in claim 6, wherein said fluid indicator assembly comprises two interconnected blades, each of said two interconnected blades comprising a planar sheet of material bent along an axis which bisects the area of said planar sheet at approximately a right angle to form a pair of vanes extending in substantially perpendicular relation to each other.

26. A sight flow apparatus as in claim 25, wherein said indicator cap includes at least one aperture to receive said axle, and shoulders which cooperate with corresponding hooks on each of said blades to couple each of said blades together, each indicator cap being supported in proximate relation to said at least one window to facilitate visual inspection of the fluid flow through said body.

27. A sight flow apparatus as in claim 16, wherein said blades include at least one opening dimensioned to allow fluid to pass therethrough.

28. A sight flow apparatus as in claim 5, wherein said at least one indicator cap has a larger profile than said blade in a direction of visual inspection perpendicular to a plane containing said at least one window.

29. A sight flow apparatus, comprising:
a body attached within a fluid line, said body having an interior cavity and at least one transparent window for visual inspection of fluid flow through said interior cavity,
a fluid indicator assembly rotatably attached to said body within the cavity of said body, said fluid indicator assembly including a flapper assembly rotatable into predetermined orientations depending on the fluid flow through the body, a counterweight and means to attach said counterweight to said flapper assembly in a first orientation with respect to said flapper assembly, said counterweight in said first orientation normally biasing said flapper assembly into a first direction when the fluid flow approaches zero in said body, and allowing said flapper assembly to move into the direction of fluid flow through said body when fluid flow is present in said body.

30. A sight flow apparatus as in claim 29, wherein said counterweight further includes means to attach said counterweight to said flapper assembly in a second orientation with respect to said flapper assembly different from said first orientation, said counterweight in said second orientation normally biasing said flapper assembly into a second direction when fluid flow approaches zero in said body, and allowing said flapper assembly to move in the direction of fluid flow through said body when fluid flow is present in said body.

31. A sight flow apparatus as in claim 30, wherein said counterweight comprises a block of material having an aperture to receive an axle in said body and said means to attach said counterweight in said first and second orientations comprises a pair of slots, each of said slots being dimensioned to receive an end of said flapper assembly depending on the selected orientation of said counterweight with respect to said flapper assembly.

32. A sight flow apparatus as in claim 31, wherein said body is attachable within a substantially vertical fluid line for visual inspection of the upward or downward vertical flow of fluid through the interior cavity of the body, and is attachable within a substantially horizontal fluid line for visual inspection of the horizontal flow of fluid through the interior cavity of the body, said counterweight being connectable in the first orientation to said flapper assembly to normally bias said flapper assembly into a substantially horizontal direction with said body when fluid flow is absent in said body, and allowing said flapper assembly to move in the direction of fluid flow through said body when fluid flow is present in said body, and said counterweight being connectable in the second orientation to said flapper assembly to normally bias said flapper assembly into a substantially vertical upward or downward direction with said body when fluid flow is absent in said body and allowing said flapper assembly to move in the direction of fluid flow through said body when fluid flow is present in said body.

33. A sight flow apparatus as in claim 30, further including an indicator cap attached to said flapper assembly and rotatable therewith into said predetermined orientations, said indicator cap being located between an end of said flapper assembly and said at least one window for facilitating visual inspection of the orientation of the flapper assembly within the body.

34. A sight flow apparatus as in claim 33, wherein said at least one indicator cap has a larger profile than said flapper assembly in a direction of visual inspection perpendicular to a plane containing said at least one window.

35. A sight flow apparatus, comprising:
an outer body attached within a fluid line, said body having an interior cavity and at least one transparent window for visual inspection of fluid flow through said interior cavity,
a fluid indicator assembly rotatably attached to said body within the cavity of said body, said fluid indicator assembly including a plurality of substantially planar blades interconnected in offset relation to each other and rotatable when fluid flows in the body, and
at least one indicator cap attached to an end of said plurality of blades to maintain said blades in fixed relationship with one another, said indicator cap including an aperture for receiving an axle, said axle rotatably mounting said fluid indicator assembly within said body.

36. A sight flow apparatus as in claim 35, wherein each of said planar blades includes a pair of slots extending laterally from one end of said blade partially along the length thereof, each of said blades being interconnected with two other blades such that each slot from one blade is interconnected with a corresponding slot from an adjacent blade.

37. A sight flow apparatus as in claim 36, wherein said at least one indicator cap including shoulders and said blades including corresponding hooks to couple said indicator cap to the end of blades.

38. A sight flow apparatus as in claim 37, wherein said indicator cap is comprised of a flat piece of non-corrosive material supported by said axle in proximate relation to said at least one window in said sight flow apparatus.

39. A sight flow apparatus as in claim 38, wherein said at least one window comprises a pair of windows to allow visual inspection of the fluid flow through said body and said at least one indicator cap comprises a pair of indicator caps, said indicator caps being coupled to opposite ends of the blades and being located proximate to a respective window to allow visual inspection of the rotation of said blades within said body.

40. A sight flow apparatus as in claim 35, wherein said blades include at least one opening extending laterally along the length thereof and being dimensioned to allow fluid to pass therethrough.

41. A sight flow apparatus as in claim 37, wherein said at least one indicator cap has a larger profile than said fluid indicator assembly in a direction of visual inspection perpendicular to a plane containing said at least one window.

42. A method for assembling a fluid indicator assembly within a sight flow apparatus, comprising the steps of:
forming a plurality of blades with axially extending slots extending inwardly from the edges of the blades, interconnecting the blades into a fluid indicator assembly such that each slot from each blade interconnects a slot from at least one adjacent blade, coupling an indicator cap to at least one end of the fluid indicator assembly such that said indicator cap locks the blades on the fluid indicator assembly in fixed relation to each other, and mounting the fluid indicator assembly on an axle supported in the sight flow apparatus such that the fluid indicator assembly can rotate on the axle.

43. A method as in claim 42, further including forming openings in each blade dimensioned to allow fluid to pass therethrough yet provide enough resistance to the fluid flow to rotate the fluid indicator assembly when the fluid indicator assembly is rotatably mounted within a sight flow indicator.

44. A method for assembling a fluid indicator device within a sight flow apparatus having an axle support therein, comprising the steps of:

coupling each of two ends of a blade to a fluid indicator cap, said fluid indicator cap having an aperture therein, inserting an axle through each of said apertures in each of said fluid indicator caps, and installing said axle on axle support so that each fluid indicator cap is located proximate to a window in the sight flow apparatus to facilitate inspecting the rotation of the blade within the sight flow apparatus.

45. A method for assembling a fluid indicator device as in claim 44, further including the step of:

selectively connecting a counterweight to said blade, said counterweight being connectable to said blade in a first orientation such that the blade normally extends in a first direction within said sight flow indicator, and connectable to the blade in a second orientation to the blade such that the blade normally extends in a second direction within said sight flow indicator, said blade being moveable from said first or second orientation into the direction of fluid flow when fluid flows through the sight flow apparatus.

* * * * *